(12) United States Patent
White et al.

(10) Patent No.: US 10,110,261 B2
(45) Date of Patent: Oct. 23, 2018

(54) TRANSCEIVER SYSTEM TO ADAPT TO ANTENNA DE-TUNING

(71) Applicant: The Charles Stark Draper Laboratory, Inc., Cambridge, MA (US)

(72) Inventors: Douglas W. White, Lexington, MA (US); Seth M. Davis, Lexington, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 15/479,414

(22) Filed: Apr. 5, 2017

(65) Prior Publication Data

US 2017/0310346 A1  Oct. 26, 2017

Related U.S. Application Data

(63) Continuation-in-part of application No. 15/456,430, filed on Mar. 10, 2017.

(60) Provisional application No. 62/346,033, filed on Jun. 6, 2016, provisional application No. 62/326,375, filed on Apr. 22, 2016.

(51) Int. Cl.

| H04B 1/06  | (2006.01) |
| H04B 1/04  | (2006.01) |
| H04B 1/40  | (2015.01) |
| H04B 1/14  | (2006.01) |
| H04B 17/10 | (2015.01) |

(52) U.S. Cl.
CPC ............ *H04B 1/0458* (2013.01); *H04B 1/14* (2013.01); *H04B 1/40* (2013.01); *H04B 17/102* (2015.01); *H04B 2001/045* (2013.01)

(58) Field of Classification Search
USPC ........... 455/26.1, 127.1, 127.2, 127.3, 114.2, 455/114.3, 193.1
See application file for complete search history.

(56) References Cited

U.S. PATENT DOCUMENTS

| 8,472,904 | B2* | 6/2013 | White ........................ H03J 3/20 |
| | | | 455/120 |
| 8,774,743 | B2* | 7/2014 | Ali .......................... H01Q 3/267 |
| | | | 455/125 |
| 9,716,311 | B2* | 7/2017 | Greene ..................... H01Q 1/50 |
| 2011/0086600 | A1* | 4/2011 | Muhammad .......... H04B 1/0458 |
| | | | 455/120 |

(Continued)

*Primary Examiner* — Fayyaz Alam
(74) *Attorney, Agent, or Firm* — Hamilton, Brook, Smith & Reynolds, P.C.

(57) ABSTRACT

A method of adapting an antenna to a transceiver system having a receiver subsystem and a transmitter subsystem comprises using an automatic tuning system to tune the antenna with respect to the receiver subsystem. The tuning results in an optimal receive signal at the receiver subsystem in response to RF energy radiated to the antenna. The tuning system may include a tuning detection element for radiating RF energy to the antenna, and a tuning element for tuning the antenna. After tuning the antenna, the method further comprises tuning a tunable matching network, coupled between an output of an RF power device of the transmitter subsystem and an input of the antenna, to facilitate an optimal power transfer amount from the RF power device to the antenna while the RF power device operates according to certain desired parameters. The desired parameters may include output power and efficiency.

24 Claims, 6 Drawing Sheets

(56) References Cited

U.S. PATENT DOCUMENTS

| | | | | |
|---|---|---|---|---|
| 2013/0322562 A1* | 12/2013 | Zhang | ................... | H04B 7/0404 |
| | | | | 375/267 |
| 2016/0173172 A1* | 6/2016 | Greene | ................ | H04B 7/0404 |
| | | | | 455/562.1 |
| 2017/0294712 A1* | 10/2017 | Russell | ..................... | H01Q 5/50 |
| 2017/0310008 A1 | 10/2017 | White | | |

* cited by examiner

TRANSCEIVER SYSTEM TO ADAPT TO ANTENNA DE-TUNING

RELATED APPLICATIONS

This application claims the benefit of U.S. Provisional Application No. 62/346,033, filed on Jun. 6, 2016; U.S. Provisional Application No. 62/326,375, filed on Apr. 22, 2016; and is a continuation-in part of U.S. application Ser. No. 15/456,430, filed on Mar. 10, 2017. The entire teachings of the above applications are incorporated herein by reference.

GOVERNMENT SUPPORT

This invention was made with government support under CON02458-1 awarded by the Defense Advanced Research Projects Agency (DARPA). The government has certain rights in the invention.

BACKGROUND

An RF transmitter/receiver (transceiver) may be electrically coupled to an antenna to transmit and receive electromagnetic radiation. The electrical coupling can be designed to create a conjugate impedance match between the transceiver and the antenna, which maximizes the power transfer between the transceiver and the antenna. In a controlled environment, the antenna input impedance remains constant, so a fixed electrical coupling generally maintains the conjugate match. In real-world environments, however, antenna detuning may occur when the input impedance of the antenna is perturbed by various factors (e.g., objects near the antenna or agents such as ice forming directly on the antenna structure).

Small RF transceivers, with correspondingly small antennas, are especially susceptible to performance degradation if the impedance of the antenna is perturbed. Antenna detuning reduces the power available to the receiver and the transmit power radiated, but it can also severely degrade the efficiency of the power amplifier in the transmitter portion of the transceiver. A conventional solution is to add a tunable impedance matching network before the antenna, along with a tuning detection network, both of which add significant losses.

SUMMARY OF THE INVENTION

The described embodiments of a transceiver tuning system combine two tuning techniques. Both of these tuning techniques utilize signal detection methods that do not add loss in the RF path.

A first tuning technique relates to a tunable antenna, with embedded tuning detection components, operative to ensure that the receiver functions efficiently and effectively. The first tuning technique utilizes sensors, test signal sources, and tuning components, embedded within the antenna itself, to adjust the antenna feedpoint impedance.

A second tuning technique involves an adaptive impedance matching system, disposed between the output of the transceiver's power amplifier and the transmit/receive switch. The adaptive impedance matching network is operative to compensate for the remaining impedance mismatch between the transceiver's power amplifier and the antenna feedpoint to ensure efficient operation.

The losses in a matching network are related to the ratio of the impedances being matched. In general, a higher the ratio results in a larger loss. In the described embodiments, the first tuning technique (adjusting the tunable antenna) operates to manipulate the antenna to exhibit a feedpoint impedance that is close enough to the receiver's input impedance to ensure good receiver performance. The resulting antenna impedance significantly reduces the impedance matching ratio that the second tuning technique (i.e., the tunable matching network) must accommodate.

A lower impedance ratio reduces the loss in the transmit path, which maximizes transmitted power. Reducing losses also extends the life of the energy storage device (e.g., battery) powering the transceiver, since less energy is wasted through the losses. Another benefit of the lower ratio is a reduction in the complexity and physical space requirements (i.e., size) of the matching network components.

The described embodiments utilize an E-field probe along with other tuning components, all embedded in the antenna, to perform the required tuning detection for both transmit and receive operations. This configuration eliminates the losses and bulk associated with components associated with conventional tuning detection devices.

The losses that are incurred when matching two impedances increase non-linearly as the real-part impedance ratio increases. By using the tunable matching network directly on the output of the transmitter's power transistor, the fixed matching network is eliminated, thereby reducing size, loss and parts count. The described embodiments trade off variations in the reflection loss against the variations in matching insertion loss, to find a tuning solution that always maximizes the RF power delivered to the antenna, consistent with a desired DC power consumption.

In one aspect, the invention may be a method of adapting an antenna to a transceiver system having a receiver subsystem and a transmitter subsystem. The method may comprise tuning the antenna with respect to the receiver subsystem using an automatic tuning system, to result in an optimal receive signal at the receiver subsystem in response to RF energy radiated to the antenna. After tuning the antenna with respect to the receiver subsystem, the method may further comprise tuning a tunable matching network, coupled between an output of an RF power device of the transmitter subsystem and an input of the antenna, to facilitate an optimal power transfer amount from the RF power device to the antenna while the RF power device operates according to one or more desired parameters.

In an embodiment, tuning the antenna may further include radiating constant-amplitude RF energy at a desired frequency, proximate the antenna, from a tuning detection element that is coupled to a mode of the antenna, and located outside of a signal path of the antenna and separated from the antenna by a gap. The constant-amplitude RF energy may be radiated in accordance with at least one mode of the antenna to which the tuning detection element is coupled. Tuning the antenna may further include receiving a signal from the antenna in response to the radiated constant-amplitude RF energy, monitoring an amplitude of the received signal, and tuning a resonant frequency of the antenna to the desired frequency, with a tuning element, based on the monitored amplitude.

Tuning the antenna may comprise maximizing the amplitude of the received signal. Tuning the antenna may comprise radiating additional RF energy in accordance with at least one additional mode of the antenna. The tuning detection element may have a resonant frequency that is non-overlapping with a frequency band of the antenna.

In an embodiment, tuning the tunable matching network may further include generating, with a current sensor, a supply current value corresponding to an amount of supply current delivered to the RF power device, and generating, with an RF power sensing device, a power sensor value that is monotonically related to an amount of power delivered to the antenna. Tuning the tunable matching network may further include providing at least one tuning signal, generated as a function of the supply current value and the power sensor value, to at least one tunable component of the tunable matching network.

Tuning the tunable matching network may further include adjusting the at least one tuning signal to a setting that results in the power sensor value being at least as large as for other settings of the at least one tuning signal, while maintaining the RF power device supply current value at a predetermined amount. Determining the predetermined amount may be accomplished by measuring an amount of supply current that occurs when the RF power device is driving a load that elicits a desired output power and efficiency from the RF power device.

Tuning the tunable matching network may further include generating the at least one tuning signal by varying the at least one tuning signal according to a step-wise gradient evaluation of the current value and the power sensor value. Generating the power sensor value may be accomplished by measuring E-fields of the antenna with a capacitively-coupled probe. The capacitively-coupled probe may be a constitutive element of the antenna.

In another aspect, the invention may be a system for adapting an antenna to a transceiver system having a receiver subsystem and a transmitter subsystem. The system may comprise an automatic antenna tuning system configured to tune the antenna with respect to the receiver subsystem, to result in an optimal receive signal at the receiver subsystem in response to RF energy radiated to the antenna. The system may further comprise an adaptive impedance matching system, comprising a tunable matching network coupled between an output of an RF power device of the transmitter subsystem and an input of the antenna. The adaptive impedance matching system may be configured to, after the antenna has been tuned with respect to the receiver subsystem, implement an impedance match between the output of the RF power device and the input of the antenna tunable matching network. Implementing the impedance match facilitates an optimal power transfer amount, from the RF power device to the antenna, that occurs while the RF power device operates according to one or more desired parameters.

In an embodiment, the automatic antenna tuning system comprises a tuning detection element coupled to a mode of the antenna. The tuning detection element transmits constant-amplitude RF energy, at a desired frequency, to the antenna in accordance with at least one mode of the antenna to which the tuning detection element is coupled. The tuning detection element located outside of a signal path conveying a signal to the antenna and separated from the antenna by a gap. The automatic antenna tuning system further comprises a processor configured to monitor an amplitude of the signal received by the antenna in response to the radiated constant-amplitude RF energy, and a tuning element for tuning a resonant frequency of the antenna to the desired frequency based on an instruction from the processor.

In an embodiment, the instruction from the processor may maximize the received signal. The automatic antenna tuning system may further comprise a feedback path for transmitting a portion of an output of the signal path to the processor. The automatic antenna tuning system may further comprise at least one additional tuning detection element for operation in accordance with at least one additional mode of the antenna.

The adaptive impedance matching system may comprises a matching network having at least one tunable component, a current sensor configured to provide a supply current value corresponding to an amount of supply current delivered to the RF power device, an RF power sensor configured to provide a power sensor value that is monotonically related to an amount of power delivered to the antenna, and a tuner configured to provide a tuning signal to the matching network. The tuning signal may be a function of the supply current value and the RF power sensor value. The tuner may adjust the tuning signal to a setting that results in the power sensor value being at least as large as for other settings of the at least one tuning signal, while maintaining the RF power device supply current value at a predetermined amount. The predetermined amount may be an amount of RF power device supply current that occurs when the RF power device is driving a load that elicits a desired output power and efficiency from the RF power source.

In an embodiment, an input impedance of the antenna is complex. The tuner may generate the at least one tuning signal using a step-wise gradient search. The antenna may be an electrically small antenna. The power sensor may be a capacitively-coupled probe configured to measure E-fields generated by the antenna. The capacitively-coupled probe may be a constitutive element of the antenna.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Figure 1:
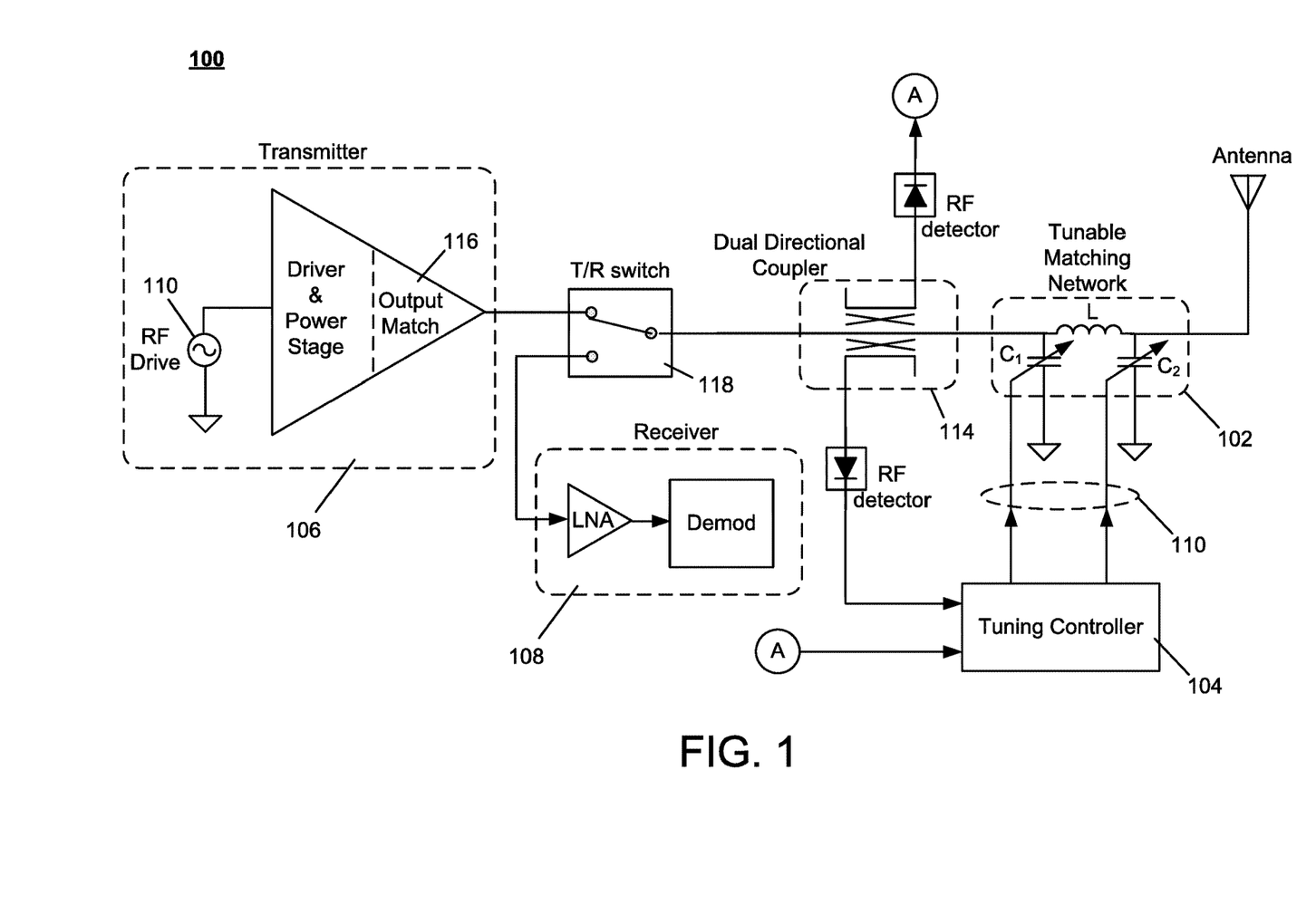
FIG. 1 illustrates a block diagram of a conventional transceiver system.

FIG. 1 illustrates a block diagram of a conventional transceiver system 100, with a tunable matching network 102, configured to monitor and minimize reflected power. Elements of the tunable matching network 102 are electrically manipulated by a tuning controller 104 to present a specific impedance (e.g., 50Ω) to the transmitter 106 and the receiver 108 of the transceiver system 100, while compensating for impedance variations at the antenna feedpoint due to antenna detuning effects. The tuning controller 104 generates the control signals 110 based on forward and reverse power, sensed by RF detectors 112, of propagating RF energy coupled from the RF path by a dual directional coupler 114. The tuning controller manipulates the elements of the matching network 102, through the control signals, to minimize the ratio of the reflected RF power to the forward RF power.

One disadvantage of the system 100 shown in FIG. 1 is excessive loss from the impedance matching circuits. System 100 utilizes two matching networks. A first, fixed matching network 116 within the transmitter 106 to match the transmitter's power amplifier transistor to a transmission path impedance (e.g. 50Ω), and the tunable matching network 102. The impedance transformation affected by the fixed matching network 116 necessarily introduces RF power loss. The RF power loss is proportional to the ratio of the real parts of the impedance transformation. High efficiency RF power amplifiers typically have a low output impedance (e.g., within a range of 10Ω to 20Ω), so amplifier output matching network 116 may exhibit significant RF power loss. The tunable matching network 102 compensates for the entire mismatch presented by the antenna, so the tunable matching network loss can also be quite high. Although the loss in the transmit path wastes power, the same loss in the receive path will increase the noise figure of the receiver by attenuating incoming signals.

Another disadvantage of the system 100 shown in FIG. 1 is loss introduced by the dual directional coupler 114, which typically is 0.5 dB or more. Yet another disadvantage of the system 100 shown in FIG. 1 is the size, cost and complexity of the required components. As described herein, two separate matching networks are required (the fixed matching network 116 and the tunable matching network 102). Further, the dual directional coupler 114, designed to operate at typical cellular frequencies, may occupy significant physical space. While miniaturized couplers exist, such smaller couplers tend to exhibit higher losses than their larger counterparts.

To attain a desired transmit power at the antenna feedpoint, the transmitter must produce RF power higher than the desired feedpoint power level in order to compensate for the losses incurred by the fixed matching network 116 and the tunable matching network 102. The T/R switch 118 needs to be robust enough to handle this higher power, which may require increased cost, size and complexity.

Finally, tuning for minimum reflected power may not guarantee maximum power to the antenna feedpoint. Because the loss through the tunable matching network 102 is not fixed, tuning for minimum reflected power does not account for the possibility that the loss through the tunable matching network 102 may be significantly higher than at a slightly different tuning point.

Figure 2:
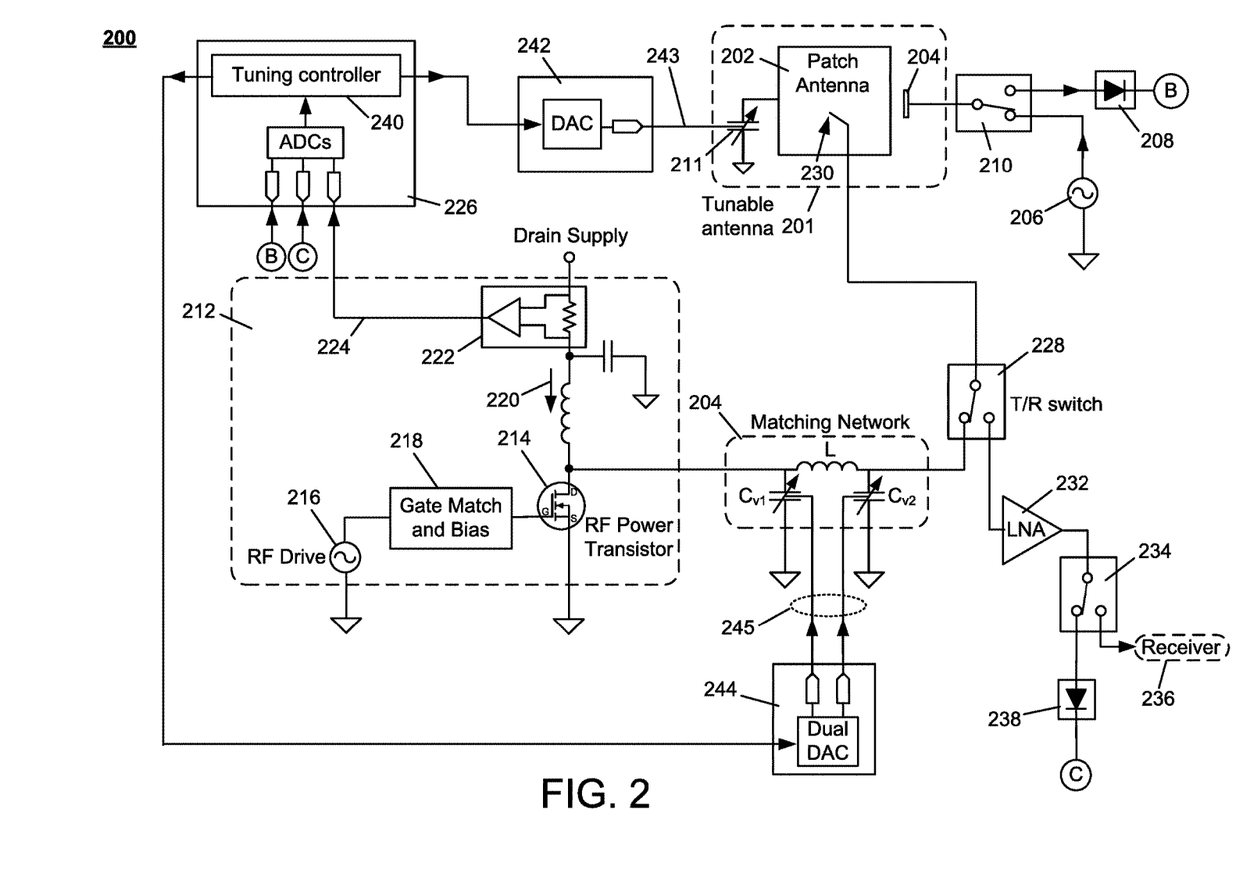
FIG. 2 illustrates an example embodiment of a transceiver tuning system constructed and arranged according to the invention.

FIG. 2 illustrates an example embodiment of a transceiver tuning system 200 constructed and arranged according to the invention. The transceiver tuning system 200 is shown with a tunable antenna system 201 comprising, for simplicity, a single polarization tunable patch antenna 202. It should be understood, however, that in alternative embodiments the described tuning techniques may be used to tune a transceiver system that comprises alternative antenna configurations.

The tunable antenna 201 further comprises an embedded E-field probe 204 that can either inject a tuning signal from a pilot tone generator 206, or couple energy from the transmit signal to an RF detector 208, depending on the state of the tune/detect switch 210. The output of the RF detector 208 is provided to the tuning controller 226. The tunable antenna 201 also comprises an electronically controlled tuning capacitor 211 to adjust the electrical characteristics (e.g., resonant frequency) of the patch antenna 202, although other embodiments may include alternative techniques and components for adjusting the electrical characteristics of the antenna.

Although the example embodiments described herein utilize a single E-field probe 204, the disclosed concepts may be extended to more than one such probe. For example, U.S. Pat. No. 8,472,094, the entire contents of which are incorporated by reference herein, describes a dual-mode antenna with two E-field probes and a quadrature network for the pilot tone. The described embodiments may utilize the E-field probes and quadrature network of such an antenna configuration, consistent with the concepts disclosed herein, to correct for polarization errors, thereby achieving high quality circular polarization. Other antenna configurations may similarly be used in conjunction with the described embodiments of a transceiver tuning system.

The RF power source 212 includes an RF power transistor 214, an RF drive source 216, and a gate match and bias network 218. The RF drive source 216 provides an RF signal, through the gate match and bias network 218 to the gate of the RF power transistor 214. The RF signal causes the RF power transistor 214 to control the flow of supply current 220 from the drain supply to ground. The output of the RF power source 212 is taken from the drain of the RF power transistor 214. The RF power source 212 further includes a supply current monitor 222 that provides a current sense signal 224 to a tuning controller 226 that corresponds to the supply current 220 supplied to the RF power transistor 208. In this example embodiment, the current monitor 222 employs a resistor and a differential amplifier, which produces the current sense signal 224 that is an amplified version of the voltage drop across the resistor. It should be understood, however, that other techniques known in the art for sensing an amount of current flow may alternatively be used. Although a Field Effect Transistor (FET) is shown for the RF power device in the example embodiment, the RF power device could be implemented with other components, e.g., other types of transistors, or a vacuum tube.

A transmit/receive (T/R) switch 228 selectively connects a feedpoint 230 of the patch antenna 202 to either the matching network 204 or a low noise amplifier (LNA) 232. The LNA 232 drives a tune/receive switch 234, which selectively directs the output of the LNA 232 to either a receiver system 236 or an RF detector 238. The output of the RF detector 238 is provided to the tuning controller 226. In the example embodiment, the RF detector 238 is a log power detector, although other embodiments may use alternative detector types.

The tunable antenna 201 of the example embodiment is controlled by a tuning controller 240 through a digital to analog converter (DAC) 242. The tuning controller 240 provides certain control functionality within the tunable antenna, such as the control of the tune/detect switch 210, the T/R switch 228 and the tune/receive switch 234, although the connections from the controller 240 to these components are not explicitly shown.

The DAC 242 drives an antenna control signal 243 to the electronically controlled tuning capacitor 211 to adjust electrical characteristics of the patch antenna 202. The tunable matching network 204 is controlled by the tuning controller 240 through dual DAC 244. The dual DAC 244 drives matching network control signals 245 to the variable components in the tunable matching network 204 (variable capacitors in this example embodiment). In both cases, the tuning controller 240 generates the control signals based on one or more of the drain current sense signal 224, the output of the RF detector 208 and the output RF detector 238.

The transceiver tuning system 200 is initially tuned for receive operation by the microcontroller 240 setting the T/R switch 228 to drive the LNA 232 (switch control signals not shown), and setting the tune/detect switch 210 to connect the pilot tone generator 206 to couple pilot tone energy into the patch antenna 202 through the embedded E-field probe 204. The tuning controller 240 adjusts the antenna tuning capacitor 211 through the DAC 242 to maximize the LNA output 232, which is detected by the RF detector 238 through the tune/receive switch 234. Adjusting the antenna tuning capacitor 211 effectively modifies the resonant frequency of the antenna. Once the signal produced by the RF detector has been maximized, the antenna center frequency will match that of the pilot tone generator, and the impedance match of the antenna will be close to 50 Ohms.

Subsequent to performing the receive operation tuning, the controller 240 performs tuning for transmit operation with an adaptive impedance matching system. For transmit operation tuning, the tuning controller 240 sets the T/R switch 228 is set to transmit (i.e., the T/R switch connects the matching network 204 to the antenna feedpoint 230), and the tuning controller 240 sets the tune/detect switch 210 is set to connect the E-field probe 204 to the RF detector 208.

Before the system is deployed, and in the absence any perturbation of the antenna impedance, a baseline value of the drain current 220 is measured when the RF power device 214 is operating both at maximum efficiency and the desired output power. In normal operation, the tunable impedance matching network 204 is adjusted to simultaneously maximize the RF voltage detected by the RF detector through the antenna probe 204, while maintaining the same baseline value of supply current 220 for the RF power device 214 that was established prior to deployment. This tuning state guarantees efficient operation of the RF power device 214 (or at least operation at an acceptable DC input power level), consistent with the maximum RF signal at the antenna. An example of this operation of the tunable matching system is presented in U.S. patent application Ser. No. 15/456,430, filed Mar. 10, 2017 and entitled "Low-Loss Compact Transmit Impedance Match Tuning Technique," the entire contents of which are incorporated by reference herein.

Although the matching network 204 is shown as a "PI" configuration on the output of the transistor 214, it should be understood that the transceiver tuning system described herein will work with any type of tunable impedance matching circuit or device.

Figure 3:
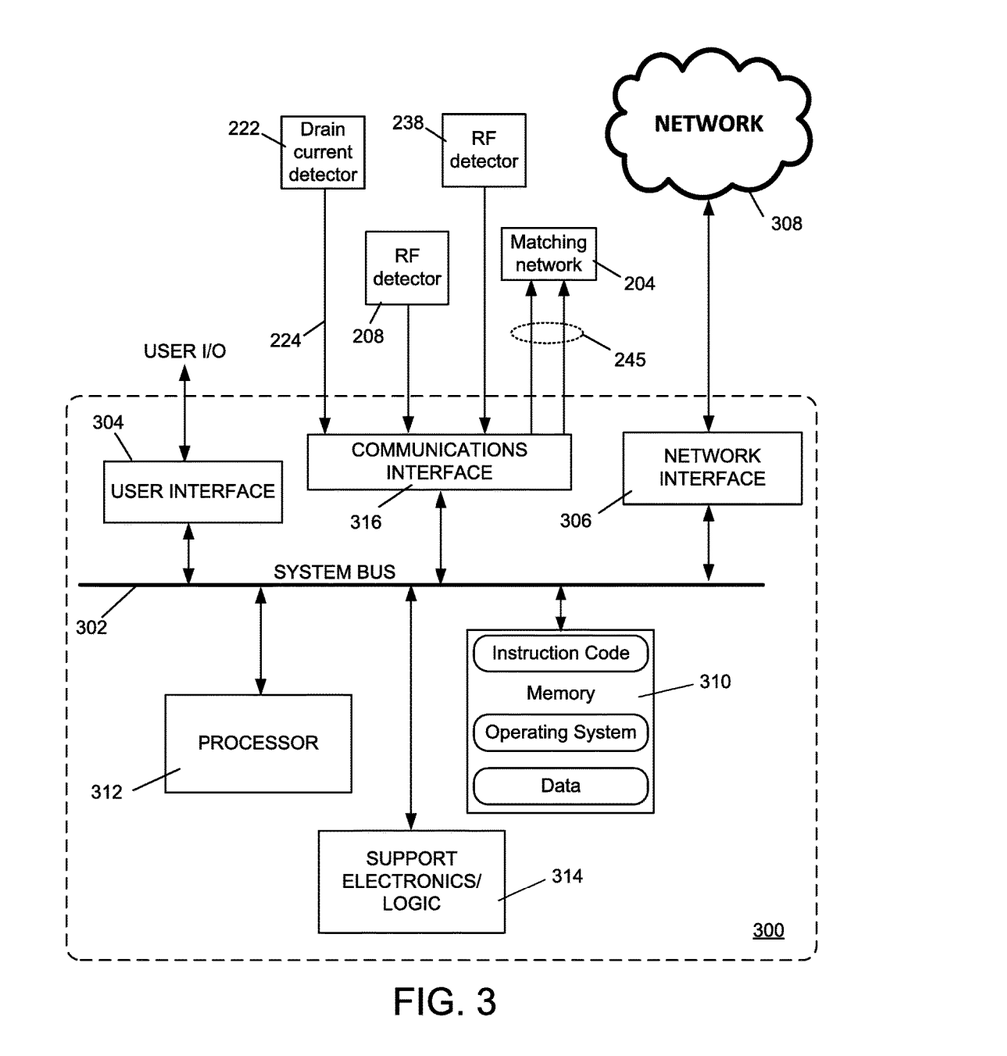
FIG. 3 is a diagram of an example internal structure of a processing system that may be used to implement embodiments of the tuning controller.

FIG. 3 is a diagram of an example internal structure of a processing system 300 that may be used to implement one or more of the embodiments of the tuning controller 240 described herein. Other processing structures may alternatively be used.

The processing system 300 may contain a system bus 302, where a bus may be a set of hardware lines used for data transfer among the components of a computer or processing system. The system bus 302 is essentially a shared conduit that connects different components of a processing system (e.g., processor, disk storage, memory, input/output ports, network ports, etc.) that enables the transfer of information between the components.

Attached to the system bus 302 may be a user I/O device interface 304 for connecting various input and output devices (e.g., keyboard, mouse, displays, printers, speakers, etc.) to the processing system 300. A network interface 306 allows the computer to connect to various other devices attached to a network 308. Memory 310 provides volatile and non-volatile storage for information such as computer software instructions used to implement one or more of the embodiments of the present invention described herein. Memory 310 also provides volatile and non-volatile storage for data generated internally and for data received from sources external to the processing system 300.

A central processor unit 312 is also attached to the system bus 302 and provides for the execution of computer instructions stored in memory 310. The system may also include support electronics/logic 314, and a communications interface 316. The communications interface may receive the RF power device supply current sense signal 224 from the current sensor 222, and the RF sense signals from RF detector 208 and RF detector 238. The communications interface 316 may provide the control signals 245 to the matching network 204.

In one embodiment, the information stored in memory 310 may comprise a computer program product, such that the memory 310 may comprise a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection.

Figure 4:
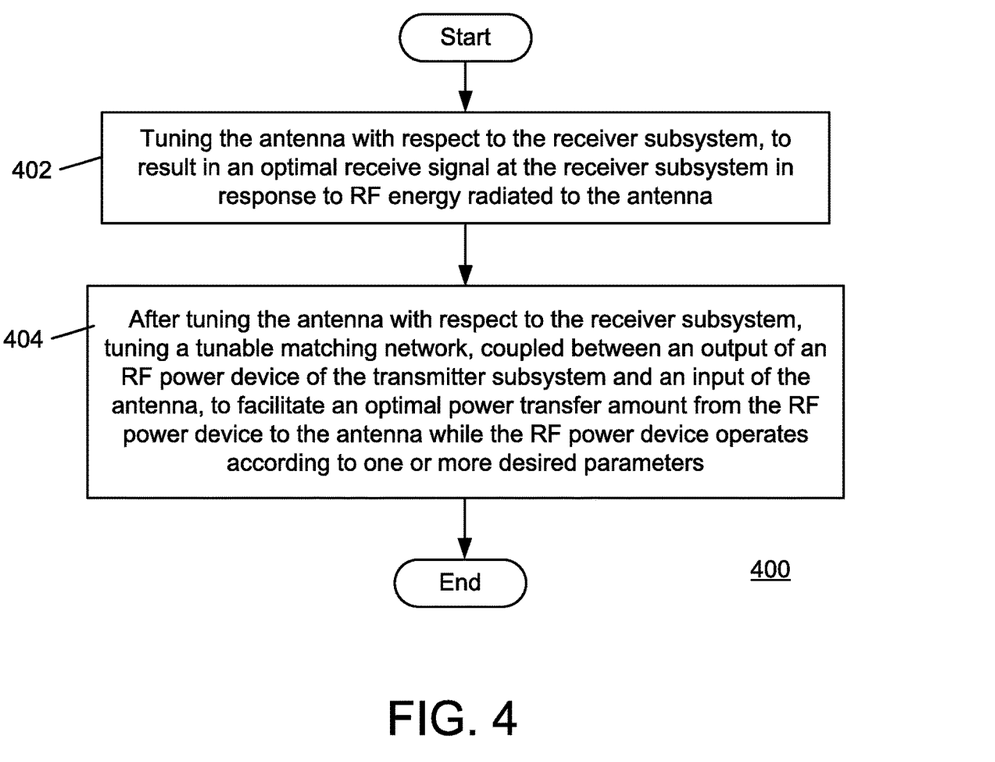
FIG. 4 illustrates one embodiment of a method of implementing a transceiver tuning system.

FIG. 4 illustrates one embodiment of a method 400 of implementing a transceiver tuning system. The method 400 includes tuning 402 the antenna with an automatic tuning system, such that a first power transfer amount from the RF power source to the antenna is less than a maximum power transfer amount. The method 400 further includes tuning a tunable matching network, coupled between an output of the RF power source and an input of the antenna, such that a second power transfer amount from the RF power source to the antenna is greater than the first power transfer value.

Figure 5:
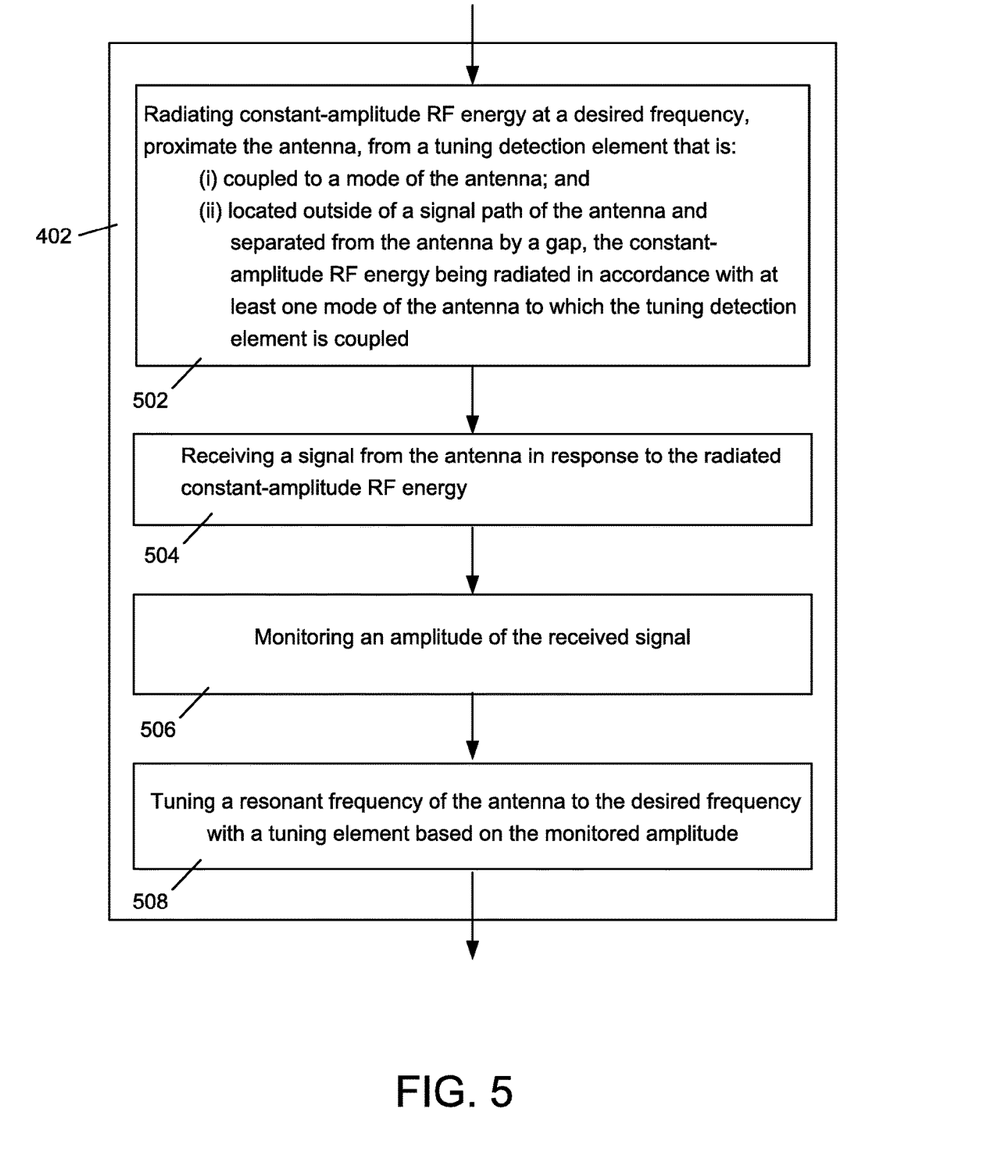
FIG. 5 illustrates an example of tuning the antenna with an automatic tuning system.

FIG. 5 illustrates an example of tuning 402 the antenna with an automatic tuning system, including radiating 502 energy proximate the antenna from a tuning detection element that is (i) coupled to a mode of the antenna, and (ii) located outside of a signal path of the antenna and separated from the antenna by a gap, the energy being radiated in accordance with at least one mode of the antenna to which the tuning detection element is coupled. Tuning 402 the antenna further includes receiving 504 a signal from the antenna in response to the energy radiated in accordance with the at least one mode, monitoring 506 an amplitude of the received signal, and tuning 508 a resonant frequency of the antenna to the desired frequency with a tuning element, based on the monitored amplitude.

Figure 6:
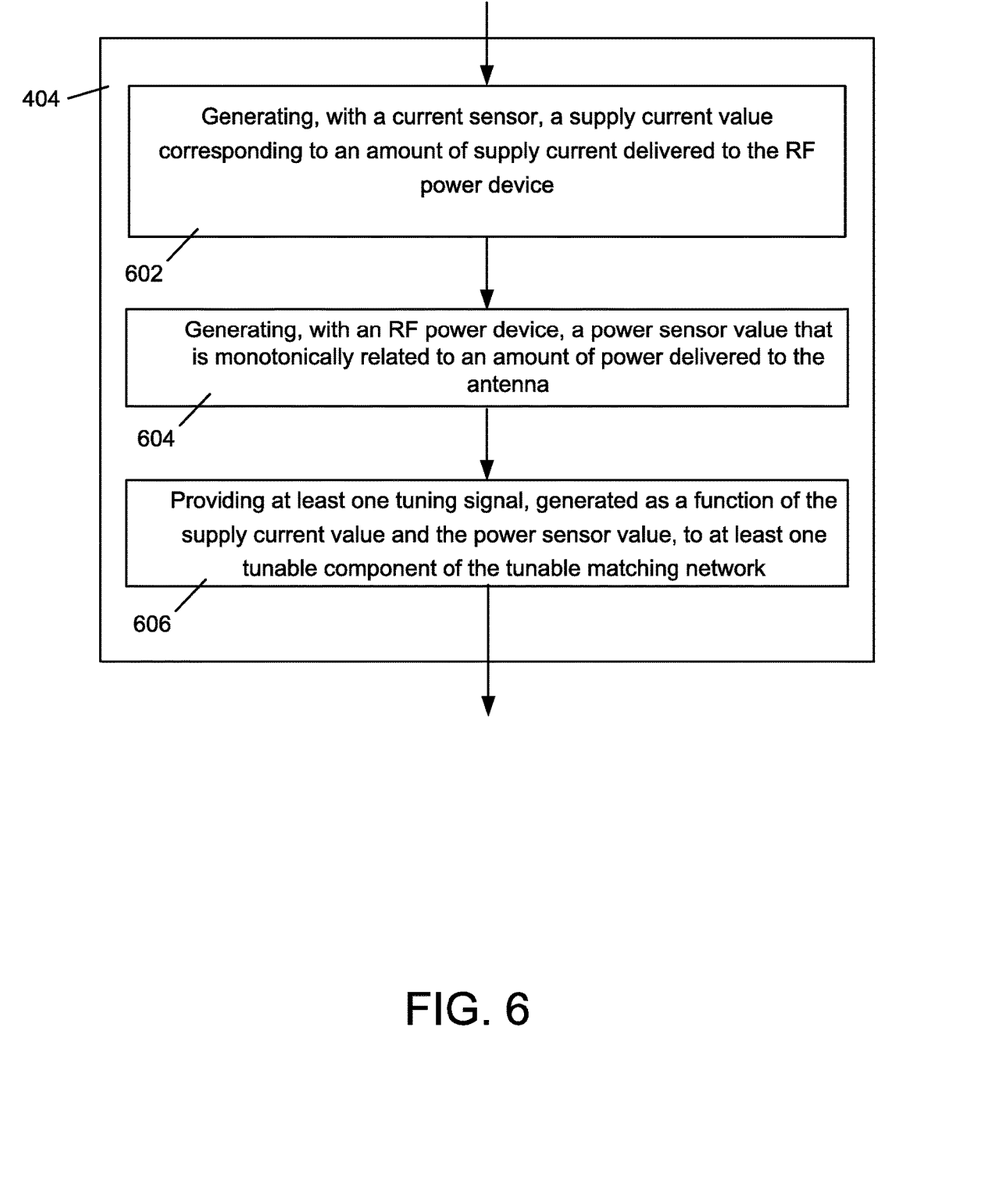
FIG. 6 illustrates an example of tuning a tunable matching network.

FIG. 6 illustrates an example of tuning 404 a tunable matching network, including generating 602, with a current sensor, a supply current value corresponding to an amount of supply current delivered to the RF power device. The tuning 404 further includes generating 604, with an RF power device, a power sensor value that is monotonically related to an amount of power delivered to the antenna. The tuning 404 also includes providing 606 at least one tuning signal, generated as a function of the supply current value and the power sensor value, to a matching network having at least one tunable component It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. A method of adapting an antenna to a transceiver system having a receiver subsystem and a transmitter subsystem, comprising:
    using an automatic tuning system, tuning the antenna with respect to the receiver subsystem, to result in an optimal receive signal at the receiver subsystem in response to RF energy radiated to the antenna;
    after tuning the antenna with respect to the receiver subsystem, tuning a tunable matching network, coupled between an output of an RF power device of the transmitter subsystem and an input of the antenna, to facilitate an optimal power transfer amount from the RF power device to the antenna while a supply current conducted by the RF power device is at a baseline value, the baseline value being an amount of supply current exhibited when the RF power device is operating both at a predetermined efficiency and at a predetermined output power.

2. The method of claim 1, wherein tuning the antenna further includes:
    radiating constant-amplitude RF energy at a desired frequency, proximate the antenna, from a tuning detection element that is:
        (i) coupled to a mode of the antenna; and
        (ii) located outside of a signal path of the antenna and separated from the antenna by a gap, the constant-amplitude RF energy being radiated in accordance with at least one mode of the antenna to which the tuning detection element is coupled;
    receiving a signal from the antenna in response to the radiated constant-amplitude RF energy;
    monitoring an amplitude of the received signal; and
    tuning a resonant frequency of the antenna to the desired frequency with a tuning element based on the monitored amplitude.

3. The method of claim 2, wherein tuning the antenna comprises maximizing the amplitude of the received signal.

4. The method of claim 2, further comprising radiating additional RF energy in accordance with at least one additional mode of the antenna.

5. The method of claim 2, wherein the tuning detection element has a resonant frequency that is non-overlapping with a frequency band of the antenna.

6. The method of claim 1, wherein tuning the tunable matching network further includes:
    generating, with a current sensor, a supply current value corresponding to an amount of supply current delivered to the RF power device;
    generating, with an RF power sensing device, a power sensor value that is monotonically related to an amount of power delivered to the antenna; and
    providing at least one tuning signal, generated as a function of the supply current value and the power sensor value, to at least one tunable component of the tunable matching network.

7. The method of claim 6, further including adjusting the at least one tuning signal to a setting that results in the power sensor value being at least as large as for other settings of the at least one tuning signal, while maintaining the RF power device supply current value at a predetermined amount.

8. The method of claim 7, further including determining the predetermined amount by measuring an amount of supply current that occurs when the RF power device is driving a load that elicits a desired output power and efficiency from the RF power device.

9. The method of claim 6, further including generating the at least one tuning signal by varying the at least one tuning signal according to a step-wise gradient evaluation of the current value and the power sensor value.

10. The method of claim 6, further including generating the power sensor value by measuring E-fields of the antenna with a capacitively-coupled probe.

11. The method of claim 10, wherein the capacitively-coupled probe is a constitutive element of the antenna.

12. A system for adapting an antenna to a transceiver system having a receiver subsystem and a transmitter subsystem, comprising:
    an automatic antenna tuning system configured to tune the antenna with respect to the receiver subsystem, to result in an optimal receive signal at the receiver subsystem in response to RF energy radiated to the antenna; and
    an adaptive impedance matching system comprising a tunable matching network coupled between an output of an RF power device of the transmitter subsystem and an input of the antenna, the adaptive impedance matching network configured to, after the antenna has been tuned with respect to the receiver subsystem, implement an impedance match between the output of the RF power device and the input of the antenna tunable matching network, to facilitate an optimal power transfer amount from the RF power device to the antenna while a supply current conducted by the RF power device is at a baseline value, the baseline value being an amount of supply current exhibited when the RF power device is operating both at a predetermined efficiency and at a predetermined output power.

13. The system of claim 12, wherein the automatic antenna tuning system comprises:
    a tuning detection element, coupled to a mode of the antenna, that transmits constant-amplitude RF energy, at a desired frequency, to the antenna in accordance with at least one mode of the antenna to which the tuning detection element is coupled, the tuning detection element located outside of a signal path conveying a signal to the antenna and separated from the antenna by a gap; and a processor configured to monitor an amplitude of the signal received by the antenna in response to the radiated constant-amplitude RF energy; and a tuning element configured to tune a resonant frequency of the antenna to the desired frequency based on an instruction from the processor.

14. The system of claim 13, wherein the instruction from the processor maximizes the received signal.

15. The system of claim 13, further comprising a feedback path for transmitting a portion of an output of the signal path to the processor.

16. The system of claim 13, further comprising at least one additional tuning detection element for operation in accordance with at least one additional mode of the antenna.

17. The system of claim 12, wherein the adaptive impedance matching system comprises:

a matching network having at least one tunable component;

a current sensor configured to provide a supply current value corresponding to an amount of supply current delivered to the RF power device;

an RF power sensor configured to provide a power sensor value that is monotonically related to an amount of power delivered to the antenna; and a tuner configured to provide a tuning signal to the matching network, the tuning signal being a function of the supply current value and the RF power sensor value.

18. The system of claim 17, wherein the tuner adjusts the tuning signal to a setting that results in the power sensor value being at least as large as for other settings of the at least one tuning signal, while maintaining the RF power device supply current value at a predetermined amount.

19. The system of claim 18, wherein the predetermined amount is an amount of RF power device supply current that occurs when the RF power device is driving a load that elicits a desired output power and efficiency from the RF power source.

20. The system of claim 17, wherein an input impedance of the antenna is complex.

21. The system of claim 17, wherein the tuner generates the at least one tuning signal using a step-wise gradient search.

22. The system of claim 17, wherein the antenna is an electrically small antenna.

23. The system of claim 17, wherein the power sensor is a capacitively-coupled probe configured to measure E-fields generated by the antenna.

24. The system of claim 23, wherein the capacitively-coupled probe is a constitutive element of the antenna.

* * * * *